United States Patent
Kwoh

(10) Patent No.: US 6,456,331 B2
(45) Date of Patent: *Sep. 24, 2002

(54) METHOD AND APPARATUS FOR DISPLAYING TEXTUAL OR GRAPHIC DATA ON THE SCREEN OF TELEVISION RECEIVERS

(75) Inventor: Daniel S. Kwoh, La Cañada/Flintridge, CA (US)

(73) Assignee: Gemstar Development Corporation, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/728,413

(22) Filed: Dec. 1, 2000

Related U.S. Application Data

(63) Continuation of application No. 09/029,013, filed as application No. PCT/US96/18236 on Nov. 13, 1996, now Pat. No. 6,204,885.
(60) Provisional application No. 60/006,629, filed on Nov. 13, 1995.

(51) Int. Cl.$^7$ ................................................ H04N 7/08
(52) U.S. Cl. .................... 348/465; 348/468; 348/569
(58) Field of Search ................... 348/569, 906, 348/563, 734, 468, 564, 465, 554, 555, 725, 553; 386/83, 124, 125, 45, 3

(56) References Cited

U.S. PATENT DOCUMENTS

| | | | |
|---|---|---|---|
| 5,181,113 A | 1/1993 | Chang | 358/142 |
| 5,493,339 A | 2/1996 | Birch et al. | 348/461 |
| 5,534,941 A | 7/1996 | Sie et al. | 348/564 |
| 5,579,057 A | 11/1996 | Banker et al. | 348/589 |
| 5,701,161 A | 12/1997 | Williams et al. | 348/468 |
| 5,870,084 A | * 2/1999 | Kanungo et al. | 345/142 |
| 6,141,002 A | * 10/2000 | Kanungo et al. | 345/327 |
| 6,256,072 B1 | * 7/2001 | Bae et al. | 348/468 |

FOREIGN PATENT DOCUMENTS

| | | |
|---|---|---|
| EP | 0047414 A1 | 3/1982 |
| EP | 0128093 A1 | 12/1984 |
| GB | 2 257 000 A * | 12/1992 |
| WO | WO94/29840 | 12/1994 |

* cited by examiner

Primary Examiner—Victor R. Kostak
(74) Attorney, Agent, or Firm—Christie, Parker & Hale, LLP

(57) ABSTRACT

A local language is pre-stored in permanent memory. Equivalent data is transmitted in the vertical blanking interval (VBI) to television receivers. Each equivalent data set comprises a unique language identifier and a foreign language translation of, or graphical representative of, the local language pre-stored in permanent memory. The viewer selects the language to be displayed from an on screen menu with a remote controller. The selected equivalent data is retrieved from the VBI and stored in a RAM for future display. When the microprocessor calls up the text of a command for display, the equivalent data is substituted for the local language data so the foreign language version of the command can be displayed in a seamless manner. If no equivalent data is in the RAM, the local language pre-stored in permanent memory is displayed on the television screen in accordance with the normal operation of the microprocessor.

20 Claims, 2 Drawing Sheets

METHOD AND APPARATUS FOR DISPLAYING TEXTUAL OR GRAPHIC DATA ON THE SCREEN OF TELEVISION RECEIVERS

CROSS REFERENCE TO RELATED APPLICATION(S)

This application is a continuation of patent application Ser. No. 09/029,013, now U.S. Pat. No. 6,204,885 filed Feb. 10, 1998, which claims the priority of international patent application No. PCT/US96/18236, filed Nov. 13, 1996 and the benefit of provisional patent application No. 60/006,629, filed Nov. 13, 1995.

BACKGROUND OF THE INVENTION

This invention relates to displaying textual or graphic data on a television screen, and more particularly to a method and apparatus for displaying video cassette recorder (VCR) and/or television programming or prompting commands in various languages.

VCRs generally come equipped with programming commands pre-stored in the VCR's permanent memory in a local language format, which are later displayed on a TV screen during programming operation. For instance, English would be the local language pre-stored in the VCR's permanent memory for VCRs sold in the United States. However, if the television viewer programming the VCR does not read English, it can make the difficult task of programming a VCR even that much more difficult.

To facilitate the process for the viewer, VCR commands will now be displayed in a variety of foreign languages. These foreign language commands, while not pre-stored in the VCR's permanent memory, will be brought to the viewer across the television signal coming into the viewer's home. This invention eliminates the need to take a VCR back to the manufacturer to have the VCR's permanent memory replaced each time a different language command set is desired. Television signals are composed of a program signal, the portion of the signal that transmits the TV picture, and a vertical blanking interval (VBI), the portion of the signal that stores various data types or messages. The VBI will be used to bring the foreign language VCR commands into the VCR and then stored in the VCR's temporary memory. The viewer can then select the foreign language of choice from options displayed on the screen and thus, program the VCR in his or her native language.

SUMMARY OF THE INVENTION

According to the invention, foreign language VCR and/or television commands arc transmitted to the viewers home, in the VBI or via another transmission link. The foreign language commands are then stored in the temporary memory for later use. Each set of foreign language commands also contains a unique language identifier used to create the menu of options available to the viewer. For example, if Spanish, French, and Chinese foreign language commands are available in the VBI, the viewer menu would display these languages as well as English on the TV screen for the viewer to use to select his or her options.

During operation, the viewer uses the TV remote control to select the language of his or her choice from the menu displayed on the television screen. The language identifiers available are compared with a user inputted language identifier. The foreign language commands corresponding to the user inputted language identifier are stored in the temporary memory for display on the television screen. If no foreign language command sets are stored, the local language pre-stored in permanent memory will be displayed on the television screen.

Preferably, a microprocessor is programmed to seamlessly retrieve the commands in the desired language for display on the television screen.

BRIEF DESCRIPTION OF THE DRAWINGS

The features of a specific embodiment of the best mode contemplated of carrying out the invention are illustrated in the drawings in which.

DETAILED DESCRIPTION OF THE SPECIFIC EMBODIMENTS

The invention contemplates the transmission of foreign language translations of a command set, called equivalent data, to be displayed on the screen of television receivers instead of a local language version of the command set. The command set can represent on-screen prompts to guide the viewer in programming a VCR or performing other VCR and/or television related tasks such as initial setup or sound or picture adjustment. The transmitted equivalent data includes a plurality of foreign language translations of, or graphical data representations of, the local language and a plurality of language identifiers, each being unique to one of the foreign language translations or graphical data representations. The invention is described below in conjunction with a cable television service, but it can also be used in a satellite or broadcast television service.

A host program source and a source of equivalent data at the headend of a television transmission system are coupled to a vertical blanking interval (VBI) encoder to insert the equivalent data into the VBI of the television signal. Alternatively, the equivalent data could be transmitted on a subcarrier of the television signal, a telephone connection, or by other known means for carrying data. Preferably, the equivalent data is repeated continuously all the time that the source is sending out a television signal.

Figure 1:
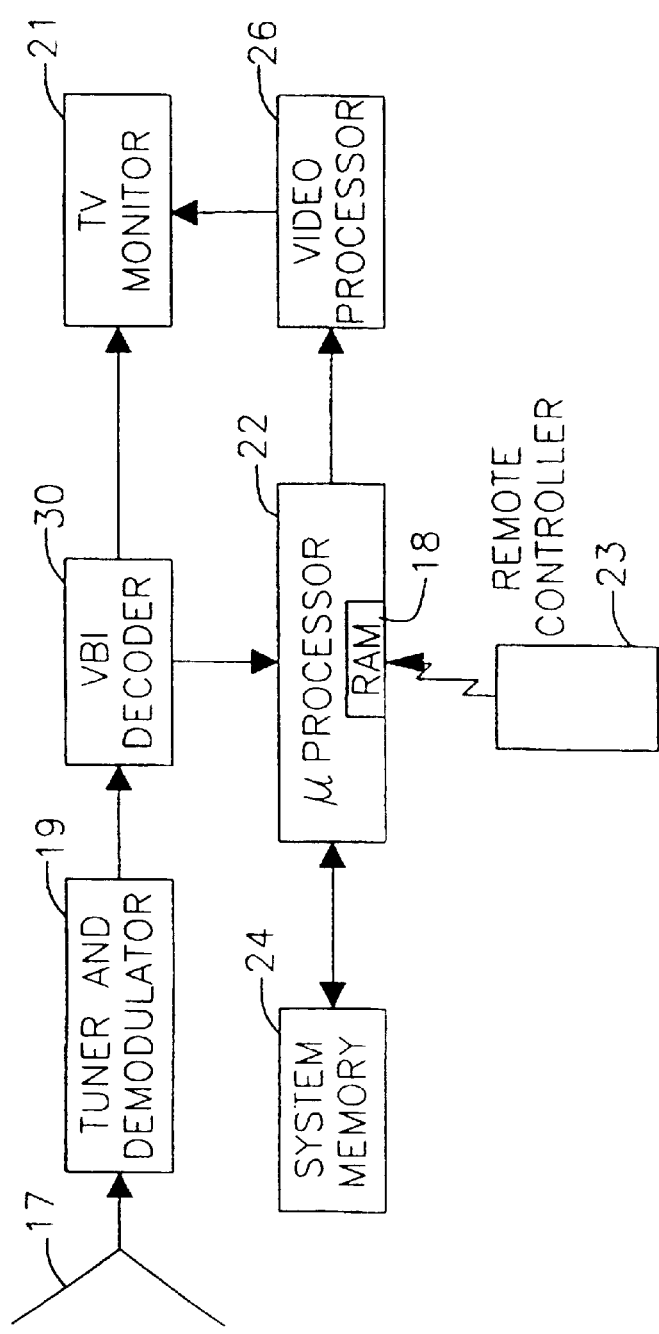
FIG. 1 is a schematic block diagram of a microprocessor controlled television receiver and/or VCR programmed to practice the invention.

In FIG. 1, the television signal is brought into the viewer's home at a cable subscriber drop 17. The television signal, which contains the transmitted equivalent data, is coupled by a tuner and demodulator 19 to a VBI decoder 30. Decoder 30 strips from the television signal the equivalent data transmitted in the VBI, which is then fed to a microprocessor 22. Microprocessor 22 includes temporary storage in the form of a RAM 18. The equivalent data is stored in RAM 18. The program signal portion of the television signal is fed to a television screen 21.

A remote controller 23 is coupled to microprocessor 22. typically by an infrared transmission link. Microprocessor 22 accesses a system memory 24 in which the local language version of the command set is stored. System memory 24 is typically a ROM or other nonalterable data storage device. Typically, the local language version of the command set is loaded into system memory 24 in the factory during the manufacturing process. Microprocessor 22 decides what data is to be displayed, either the local language stored in system memory 24 or the equivalent data stored in RAM 18. The data to be displayed is composed by microprocessor 22 in a video processor 26, in well known fashion. and then sent to television screen 21 for display.

Figure 2:
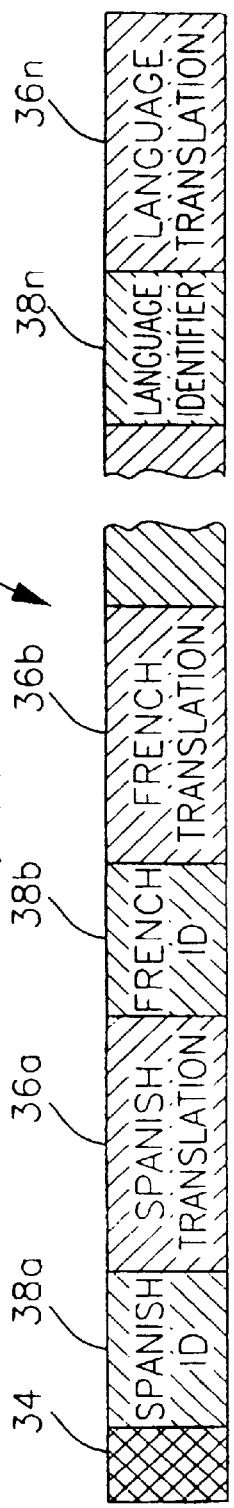
FIG. 2 is an diagram representing data transmitting in the VBI.

FIG. 2 depicts equivalent data 32 carried in the VBI. A header field 34 designates the beginning of the equivalent data and controls operation of decoder 30 with clock run in and framing code information. Following header field 34 are the foreign language translations or graphical data representatives of the command set represented by encoded textual data 36a, 36b, . . . , 36n, each of which is preceded by a unique language identifier field 38a, 38b, . . . , 38n, respectively. As described below in more detail, the individual commands preferably each have an address that defines the location on screen where such command is to be displayed. The same address is thus used for a given command in each language. The language identifiers represent foreign language options, for example French, Spanish, Chinese, etc.

Figure 4:
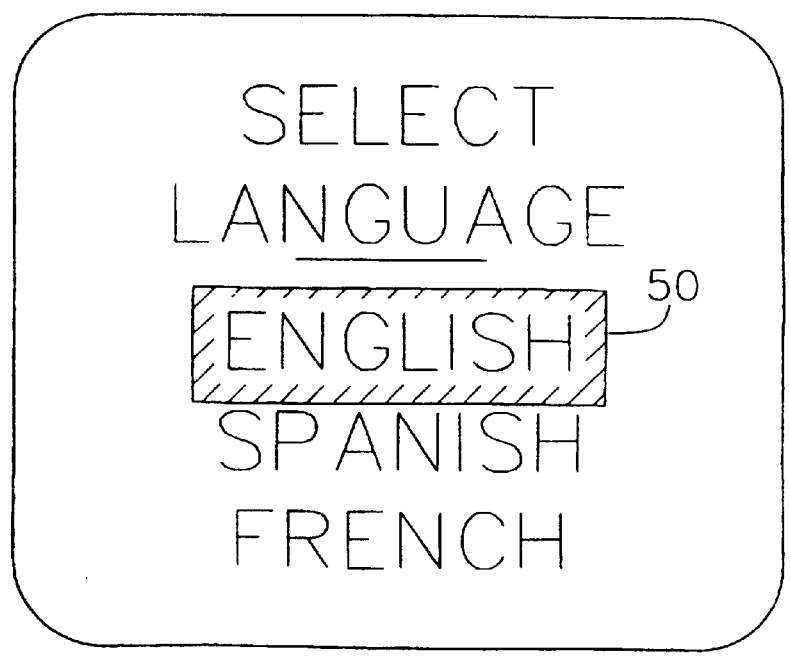
FIG. 4 is a television screen display of a menu for viewer selection of the language for the commands.

In operation, the viewer presses a set up key on remote controller 23 to initiate a set up mode and then keys in his or her preference of foreign language. Specifically. the viewer selects the foreign language from an on-screen menu shown in FIG. 4. The default selection marked with a cursor 50 is the local language, e.g., English To select a different language the viewer moves cursor 50 by operating arrow keys on controller 23 and then depresses an enter key on controller 23. The corresponding language identifier is retrieved by microprocessor 22 for comparison with the language identifiers trarnsmitted in the VBI. When a match is detected by microprocessor 22, the corresponding language textual data is "grabbed" from the VBI and downloaded to RAM 18. For example, if the viewer wishes to select the Spanish language equivalent data set, he or she moves cursor 50 and enters that choice into remote controller 23. In such case, microprocessor 22 displays the commands in the selected language. If no equivalent data set is stored in RAM 18, i.e., if the viewer does not select a foreign language, microprocessor 22 displays the local language version of the commands stored in system memory 24.

Although it is preferable to store only a single foreign language command set in RAM 18 to minimize the amount of data storage, all, or at least more than one, of the foreign language command sets could be downloaded to RAM 18 and the selection of the desired foreign language for display could be made by the viewer after the data is downloaded.

Figure 3:
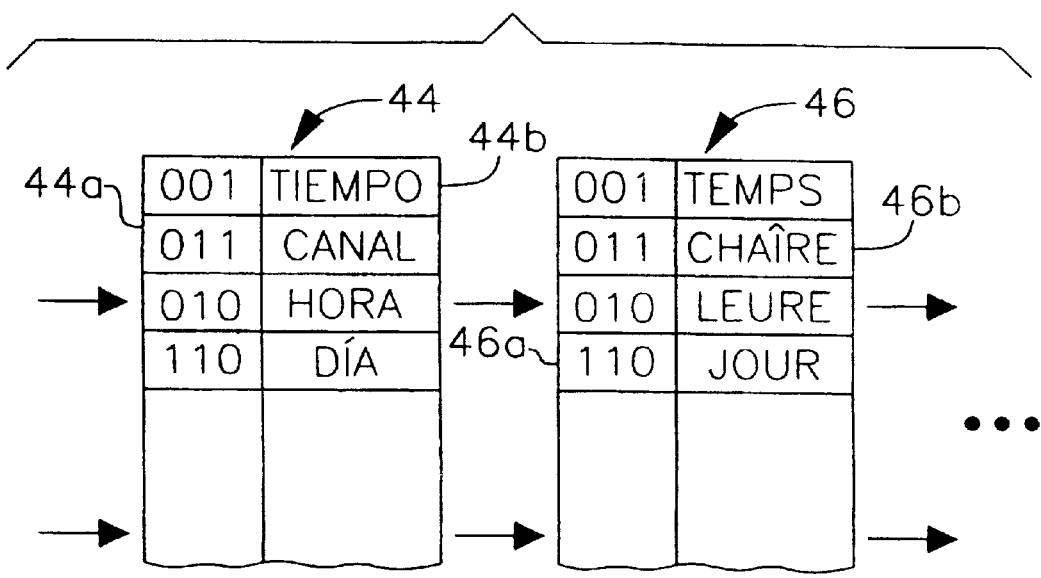
FIG. 3 is a diagram representing equivalent data that illustrate the operation of the invention.

In FIG. 3 there is one equivalent data set for each language identifier. For example, if the local language commands include "time, channel, hour. day," the Spanish command set 44 includes "tiempo, canal, hora, dia," and the French command set 46 includes "temps, chaine, heure, jour." The individual commands of each set also have addresses to designate where they are to be placed on the screen to create the desired message. For example, command set 44 has addresses 44a and commands 44b, e.g., "tiempo", and command set 46 has addresses 46a and commands 46b, e.g., "temps". The same address is used for a given command, regardless of the language, e.g., "001" for tiempo and temps, because the address identifies the location of the command displayed on the screen. The same addresses are also used for the local language command set stored in system memory 24, i.e., "001" for temperature. In other words, the address of each local language command in system memory 24 is the same as the address of the corresponding foreign language command in RAM 18.

Alternatively, a different address structure could be used for the local language command set, so each television manufacturer could select its own address structure. In this case, a table is downloaded to RAM 18 in the VBI after the viewer keys in a identification code for h/her particular television model and brand to relate the addresses of the native language to the addresses of the foreign language.

Microprocessor 22 is programmed to operate seamlessly regardless of the language selected by the viewer. A status bit is stored in microprocessor 22. The status bit is one value i.e., binary "1", if a foreign language command set is downloaded to RAM 18, i.e., the downloaded foreign language is to be displayed, and the status bit is the other value, i.e., binary "0", if no foreign language command set has been selected, i.e., the local language is to be displayed. When microprocessor 22 makes a call for a command in the course of its operation, an address is issued to designate the screen location of the command. Microprocessor 22 checks the status bit to determine its value. If the status bit is a binary "1", the address is routed to RAM 18 to retrieve the foreign language command to be displayed at the screen location designated by the address. (If a table is stored in RAM 18. the issued address is converted by reference to the table to an address that designates the screen location at which the foreign language command is to be displayed.) If the status bit is a binary "0", the address is routed to system memory 24 to retrieve the local language command to be displayed at the screen location designated by the address.

Since not all television receivers come with a local language stored in system memory 24, all of the equivalent data sets, including the local language, can be transmitted and stored in microprocessor RAM 18. In this case. there is no default language choice and the viewer must make a choice from the menu of FIG. 4.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention.

What is claimed is:

1. A system for displaying textual or graphic data on a television receiver comprising:

a memory device at the television receiver in which data representing local language commands is stored;

a microprocessor electrically coupled to the memory device for displaying the local language commands stored in the memory device on the television receiver;

a VBI decoder for extracting data from a VBI of a television signal, wherein the extracted data includes commands, in one or more foreign languages, corresponding to the local language commands; and a storage device at the television receiver for storing the extracted data, wherein the microprocessor is configured to substitute the commands in one or more foreign languages for the local language commands for displaying on the television receiver.

2. The system of claim 1, further comprising a status bit stored in the microprocessor for indicating whether the local language commands or the commands in one or more foreign languages are to be displayed.

3. The system of claim 2, further comprising means for changing the status bit by a user.

4. The system of claim 1, wherein the extracted data includes unique language identifiers corresponding to the foreign language commands.

5. The system of claim 4, further comprising an input device for transmitting a viewer's choice of the language identifiers to the microprocessor.

6. The system of claim 5, wherein the local language commands have addresses in the memory device that identify the location on the television receiver where the commands are to be displayed and the corresponding foreign language commands have the same addresses in the storage device.

7. The system of claim 1, in which the storage device is a RAM.

8. The system of claim 1, in which the memory device is a ROM.

9. A method for displaying textual or graphic data on television receivers comprising the steps of:

storing in a memory device at the television receiver data representing local language commands;

transmitting to a television receiver equivalent data in a VBI of a television signal, the equivalent data including a plurality of translations or graphical representatives, in one or more foreign languages, of the local language commands;

storing the equivalent data in a storage device at the television receiver; and configuring a microprocessor to substitute the equivalent data for the local language commands for displaying on the television receiver.

10. The method of claim 9, further comprising the steps of:

creating a language menu including a listing of the foreign languages; and displaying the language menu on the screen.

11. The method of claim 10, further comprising the steps of:

choosing one of the transmitted foreign languages from the language menu at the television receiver; and displaying foreign language translation of the commands corresponding to the chosen foreign language on the screen.

12. The method of claim 9, further comprising the steps of:

attaching to the transmitted equivalent data a plurality of language identifiers, each being unique to one of the foreign language translations or graphical data representations;

inputting a choice from among the language identifiers;

comparing the inputted choice with the language identifiers attached to the equivalent data; and displaying the equivalent data when a match occurs in the comparing step.

13. The method of claim 9, wherein the step of transmitting comprises inserting the equivalent data into the VBI of television signal at a head end location.

14. The method of claim 9, wherein the step of transmitting equivalent data also transmits the local language commands and a local language identifier.

15. The method of claim 9, further comprising the step of assigning addresses to the local language commands and the equivalent data indicating the location on the television receiver where the commands are to be displayed.

16. The method of claim 9, further comprising the step of configuring the microprocessor when a call is made to issue an address to designate a screen location, retrieve the command responsive to a status bit and the issued address, and display the retrieved command.

17. A method for displaying textual or graphic data on a screen of a television receiver comprising the steps of:

storing in a local memory at the television receiver a set of commands in a first language;

receiving on a subcarrier of a television signal a set of the same commands in a second language;

storing at the television receiver the received set of commands in a second language;

selecting one of the sets of commands for display on the screen; and configuring a microprocessor to display the selected set of commands on the screen of the television receiver.

18. The method of claim 17, wherein the step of receiving comprises extracting from a VBI of a television signal a set of the same commands in a second language.

19. The method of claim 17, further comprising the steps of:

creating a language menu including a listing of the foreign languages;

displaying the language menu on the screen;

choosing one of the transmitted foreign languages from the language menu at the television receiver; and displaying foreign language translation of the commands corresponding to the chosen foreign language on the screen.

20. The method of claim 17, further comprising the step of configuring the microprocessor when a call is made to issue an address to designate a screen location, retrieve the command responsive to a status bit and the issued address, and display the retrieved command.

* * * * *

UNITED STATES PATENT AND TRADEMARK OFFICE
CERTIFICATE OF CORRECTION

PATENT NO. : 6,456,331 B2 Page 1 of 1
APPLICATION NO. : 09/728413
DATED : September 24, 2002
INVENTOR(S) : Daniel S. Kwoh It is certified that error appears in the above-identified patent and that said Letters Patent is hereby corrected as shown below:

On the title page:
Item [63] (Related U.S. Application Data), change

"Continuation of application No. 09/029,013, filed as application No. PCT/US96/18236 on Nov. 13, 1996, now Pat. No. 6,204,885."

to

--Continuation of application No. 09/029,013, now U.S. Pat. No. 6,204,885, filed on Apr. 26, 1999, which is a 371 of application No. PCT/US96/18236, filed on Nov. 13, 1996. --;

Column 1, lines 9-10, change "Feb. 10, 1998" to --Apr. 26, 1999--.

Signed and Sealed this

Seventeenth Day of July, 2007

JON W. DUDAS
*Director of the United States Patent and Trademark Office*